E. H. COVEL.
Coffee Pot.
No. 22,856.
Patented Feb. 8, 1859.
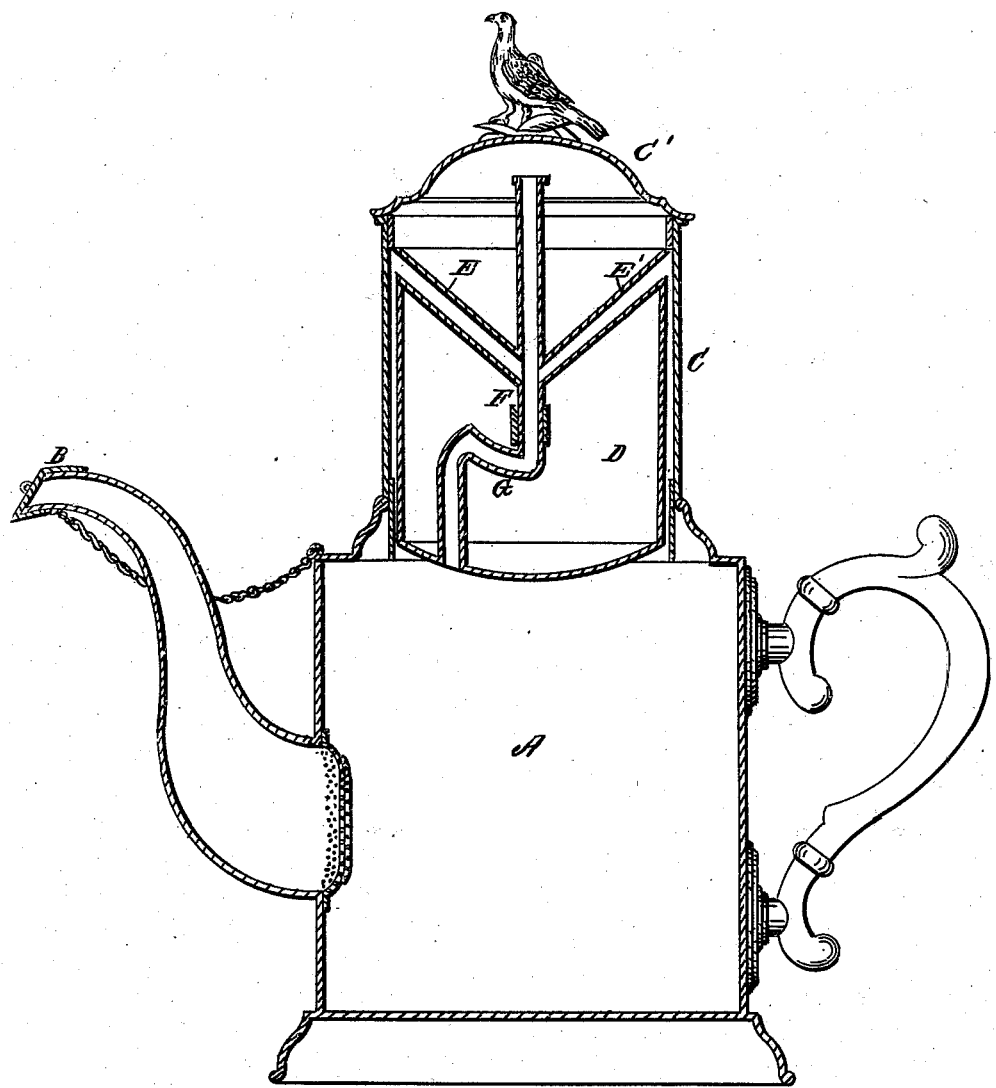
Witnesses:
E. P. Averell
M. Haskell.
Inventor:
E. Hall Covel.

UNITED STATES PATENT OFFICE.

E. HALL COVEL, OF NEW YORK, N. Y.

COFFEE-POT.

Specification of Letters Patent No. 22,856, dated February 8, 1859.

*To all whom it may concern:*

Be it known that I, E. HALL COVEL, of the city, county, and State of New York, have invented certain new and useful Improvements in Condensing Coffee-Pots; and I do hereby declare that the following is a full and exact description of the same, reference being had to the accompanying drawing, and to the letters of reference marked thereon, showing a vertical section of a coffee-pot having my improvements attached.

My invention relates to that class of coffee pots in which the vapor from the water in which the coffee is boiled is condensed in a separated chamber, and returned to the body of the pot, to retain the aroma of the coffee, and consists in providing a largely increased amount of surface, against, or in which, the vapor of the boiling coffee is condensed, to be returned to the body of the pot to mingle with its contents, and in placing a water valve in the steam pipe of the pot to act as a safety valve, which is displaced to allow the steam to escape in case the boiling should be so intense as to create steam more rapidly than could be condensed.

A is the body of the pot, formed of any of the shapes and materials ordinarily employed.

B is a cover to the end of the spout, which is put upon the end of the spout to close its aperture when the pot is boiling.

C is an upper chamber, which is fitted to the mouth of the pot, and has within it the condensing chamber D, made enough smaller than it to leave an annular space of about one quarter of an inch between them.

The condensing chamber is united to the outer one at its upper edge to prevent the vapor passing off at that point into the interior of it, and is filled with cold water as high as the top of the condensing pipes E, E′, for the purpose of keeping those pipes, and its outer surface cool to condense the vapor which comes in contact with the latter, or enters the former. It can be removed when the boiling operation is completed, and its cover C′ taken off and put upon the mouth of the pot, to make the pot more convenient to handle and manage when its contents are to be poured out.

E, E′ are condensing pipes (of which there may be a greater number, if desired) attached to the inner side of the condensing chamber at its top, which are inclined downward, and are joined to the steam pipe F, and through which such portion of the vapor from the body of the pot as is uncondensed by contact with the exterior surface of the condensing chamber passes to be condensed, and runs downward through the pipe F into the body of the pot.

G is a "trap" in the pipe F, which fills with the condensed vapor, and which remains full when the pot is in ordinary operation, to act as a water safety-valve to relieve the body of the pot from an undue pressure induced by the boiling being carried on more rapidly—either by carelessness or accident—than can be relieved by the condensing surfaces named, or by passing off by the pipes E, E′ and F; which it effects by the steam blowing the water in the trap out at the top of the pipe F, and passing through apertures in the cover C′ made for the purpose. So long as such undue pressure continues the vapor escapes in the manner described, but as soon as it is decreased, the ordinary operation of the pot again takes place by the condensed vapor filling the trap and acting as a valve as above mentioned.

By passing the vapor into the annular space between the chambers C and D the condensation of it is materially aided by the exterior of the former being in contact with the air, thereby rendering the water contained in the condensing chamber available for its purpose for a longer period of time.

Several devices have been proposed to effect the condensation of the vapor of boiling coffee, but they have either proved failures through their not possessing sufficient condensing surface to condense the vapor as rapidly as it would ordinarily be created; or else dangerous, by being liable to explosion in case the pressure should be increased to an undue degree; both of which defects are remedied by my improvements which renders the pot perfect in its operation in the first respect, and as safe, and as easily managed, in the other, as the open pot in general use.

What I claim as my invention, and desire to secure by Letters Patent is—

1. The combination of the chamber C, with the condensing chamber D, and condensing pipes E, E', as, and for the purpose set forth.

2. The combination of the condensing pipes E, E', with the steam pipe F, and trap G, as described, and for the purposes set forth.

E. HALL COVEL.

Witnesses:
GEORGE N. BUCKMAN,
M. HASKELL.